(12) United States Patent
Oberman

(10) Patent No.: US 6,490,607 B1
(45) Date of Patent: Dec. 3, 2002

(54) SHARED FP AND SIMD 3D MULTIPLIER

(75) Inventor: Stuart F. Oberman, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/416,401

(22) Filed: Oct. 12, 1999

Related U.S. Application Data

(63) Continuation-in-part of application No. 09/014,454, filed on Jan. 1, 1998, now Pat. No. 6,144,980, which is a continuation-in-part of application No. 09/049,752, filed on Mar. 27, 1998, now Pat. No. 6,269,384, which is a continuation-in-part of application No. 09/134,171, filed on Aug. 14, 1998, now Pat. No. 6,223,198.

(51) Int. Cl.[7] ............................................... G06F 7/52
(52) U.S. Cl. ......................... 708/620; 708/503; 708/498
(58) Field of Search ................................ 708/620, 503, 708/497, 498

(56) References Cited

U.S. PATENT DOCUMENTS

| | | | | |
|---|---|---|---|---|
| 4,620,292 A | * | 10/1986 | Hagiwara et al. | 708/503 |
| 4,953,119 A | * | 8/1990 | Wong et al. | 708/503 |
| 5,293,558 A | * | 3/1994 | Narita et al. | 708/620 |
| 5,675,526 A | * | 10/1997 | Peleg et al. | 708/620 |
| 6,038,583 A | * | 3/2000 | Oberman | 708/620 |
| 6,099,158 A | * | 8/2000 | Gorshtein et al. | 708/503 |
| 6,226,737 B1 | * | 5/2001 | Elliott et al. | 708/503 |
| 6,233,595 B1 | * | 5/2001 | Cheng et al. | 708/503 |

\* cited by examiner

*Primary Examiner*—David H. Malzahn
(74) *Attorney, Agent, or Firm*—B. Noël Kivlin

(57) ABSTRACT

A multiplier configured to perform multiplication of both scalar floating point values (X×Y) and packed floating point values (i.e., $X_1 \times Y_1$ and $X_2 \times Y_2$). In addition, the multiplier may be configured to calculate X×Y−Z. The multiplier comprises selection logic for selecting source operands, a partial product generator, an adder tree, and two or more adders configured to sum the results from the adder tree to achieve a final result. The multiplier may also be configured to perform iterative multiplication operations to implement such arithmetical operations such as division and square root. The multiplier may be configured to generate two versions of the final result, one assuming there is an overflow, and another assuming there is not an overflow. A computer system and method for performing multiplication are also disclosed.

20 Claims, 11 Drawing Sheets

| VALUE | SIGN | EXPONENT | SIGNIFICAND |
| --- | --- | --- | --- |
| zero | x | $00\ldots00_2$ | $0.00\ldots00_2$ |
| infinity | x | $11\ldots11_2$ | $1.00\ldots00_2$ |
| QNaN | x | $11\ldots11_2$ | $1.1xx\ldots xx_2$ |
| SNaN | x | $11\ldots11_2$ | $1.0xx\ldots xx_2$ |
| denormal | x | $00\ldots00_2$ | $0.xx\ldots xx_2$ |

FIG. 2

|  | SINGLE | DOUBLE | EXTENDED | INTERNAL |
|---|---|---|---|---|
| RN | (24'b0,1'b1,126'b0) | (53'b0,1'b1,97'b0) | (64'b0,1'b1,86'b0) | (68'b0,1'b1,82'b0) |
| RZ | 151'b0 | 151'b0 | 151'b0 | - |
| RM | (24'b0,(127(Sign))) | (53'b0,(98(Sign))) | (64'b0,(87(Sign))) | - |
| RP | (24'b0,(127(!Sign))) | (53'b0,(98(!Sign))) | (64'b0,(87(!Sign))) | - |
| LASTMUL | (25'b0,1'b1,125'b0) | (54'b0,1'b1,96'b0) | (65'b0,1'b1,85'b0) | (69'b0,1'b1,81'b0) |
| ITERMUL | (76'b0,1'b1,74'b0) | | | |
| BACKMUL | (!Dividend[67:0],(83(1'b1))) | | | |

FIG. 6

| Guard Bit | Remainder | RN | RP (+/-) | RM (+/-) | RN |
|---|---|---|---|---|---|
| 0 | =0 | trunc | trunc | trunc | trunc |
| 0 | - | trunc | trunc/dec | dec/trunc | dec |
| 0 | + | trunc | inc/trunc | trunc/inc | trunc |
| 1 | =0 | RNE | inc/trunc | trunc/inc | trunc |
| 1 | - | trunc | inc/trunc | trunc/inc | trunc |
| 1 | + | inc | inc/trunc | trunc/inc | trunc |

FIG. 10

SHARED FP AND SIMD 3D MULTIPLIER

RELATED APPLICATIONS

This application is a continuation-in-part of the following: (i) U.S. application Ser. No. 09/014,454, filed on Jan. 1, 1998, now U.S. Pat. No. : 6,144,980; which is hereby incorporated by reference in its entirety; (ii) U.S. application Ser. No. 09/049,752, filed on Mar. 27, 1998, now U.S. Pat. No. : 6,269,384 which is hereby incorporated by reference in its entirety; and (iii) U.S. application Ser. No. 09/134,171, filed on Aug. 14, 1998, now U.S. Pat. No. : 6,223,198 which is hereby incorporated by reference in its entirety.

BACKGROUND OF THE INVENTION

1. Field of the Invention

This invention relates generally to the field of microprocessors and, more particularly, to multipliers that are usable to perform floating point calculations in microprocessors.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex floating-point arithmetic operations including multiplication and reciprocal operations. These specialized execution units typically comprise hardware that is optimized to perform one or more floating-point arithmetic functions.

Most microprocessors must support multiple data types. For example, x86 compatible microprocessors must execute instructions that are defined to operate upon an integer data type and instructions that are defined to operate upon floating-point data types. Floating-point data can represent numbers within a much larger range than integer data. For example, a 32-bit signed integer can represent the integers between $-2^{31}$ and $2^{31}-1$ (using two's complement format). In contrast, a 32-bit ("single precision") floating-point number as defined by the Institute of Electrical and Electronic Engineers (IEEE) Standard 754 has a range (in normalized format) from $2^{-126}$ to $2^{127} \times (2-2^{-23})$ in both positive and negative numbers.

Turning now to FIG. 1A, an exemplary format for an 8-bit integer 100 is shown. As illustrated in the figure, negative integers are represented using the two's complement format 104. To negate an integer, all bits are inverted to obtain the one's complement format 102. A constant of one is then added to the least significant bit (LSB).

Turning now to FIG. 1B, an exemplary format for a 32-bit (single precision) floating-point number 106 is shown. A floating-point number is represented by a significand, an exponent and a sign bit. The base for the floating-point number is raised to the power of the exponent and multiplied by the significand to arrive at the number represented. In microprocessors, base 2 is typically used. The significand comprises a number of bits used to represent the most significant digits of the number. Typically, the significand comprises one bit to the left of the radix point and the remaining bits to the right of the radix point. In order to save space, the bit to the left of the radix point, known as the integer bit, is not explicitly stored. Instead, it is implied in the format of the number. Additional information regarding floating-point numbers and operations performed thereon may be obtained in IEEE Standard 754 (IEEE-754). Unlike the integer representation, two's complement format is not typically used in the floating-point representation. Instead, sign and magnitude form are used. Thus, only the sign bit is changed when converting from positive value 106 to negative value 108.

In the x86 architecture, the floating point format supports a number of special cases. These special cases may appear in one or more operands or one or more results for a particular instruction. FIG. 2 illustrates the sign, exponent, and significand formats of special and exceptional cases that are included in the IEEE-754 floating-point standard. The special and exceptional cases shown in FIG. 2 include a zero value, an infinity value, NaN (not-a-number) values, and a denormal value. An 'x' in FIG. 2 represents a value that can be either one or zero. NaN values may include a QNaN (quiet not-a-number) value and a SNaN (signaling not-a-number) value as defined by a particular architecture. The numbers depicted in FIG. 2 are shown in base 2 format as indicated by the subscript 2 following each number. As shown, a number with all zeros in its exponent and significand represents a zero value in the IEEE-754 floating-point standard. A number with all ones in its exponent, a one in the most significant bit of its significand, and zeros in the remaining bits of its significant represents an infinity value. The remaining special and exceptional cases are depicted similarly.

Given the substantial differences in floating point and integer formats, microprocessor designers have typically used two sets of execution units, i.e., one set optimized to perform arithmetic on integer instructions and one set optimized to perform arithmetic on floating point instructions. Unfortunately, this approach has some potential drawbacks. Die space on a microprocessor is a relatively scarce commodity, and the die space required to implement complex execution units such as multipliers is significant. Thus, duplicating multipliers for both integer and floating point formats consumes precious real estate that could be used to implement additional functionality.

The recent addition of three-dimensional graphics instructions (e.g., AMD's 3DNow™ instructions) to the standard x86 instruction has further complicated matters by increasing the performance demands on the microprocessor's arithmatic execution units (and multiplier execution units in particular). As those skilled in the art will appreciate, 3DNow™ instructions are so-called SIME (single instruction, multiple data) instructions that have operands that include multiple floating point values packed together.

As a result, a method for executing arithmetic instructions with different instruction and data formats is needed. In particular, a method for executing multiply instructions having different data types without dramatically increasing the die space used is desired.

SUMMARY

The problems outlined above are in large part solved by the multiplier and method for performing multiplication described herein. In one embodiment, a single multiplier may be configured to perform scalar floating point multiplication and packed floating point multiplication, e.g., single-instruction multiple-data (SIMD) multiplication.

The multiplier may include selection logic that is configured to select a multiplier operand and a multiplicand operand from among a plurality of different potential sources, wherein the potential sources may include one or more of the following: a floating point operand, a packed floating point operand, or the result of a previous iterative multiplication instruction. For example, the multiplier may perform scalar 90-bit format floating point multiplication (i.e., single, double, extended, or internal precision), packed 90-bit format (i.e., 2 packed 32-bit floating point values); or the results of a previous multiplication instruction (i.e., via an internal bypass mechanism for instructions such as iterative multiplication operations). For example, some instructions such as reciprocal instructions (used to perform division) and square root instructions may be implemented using iterative algorithms that perform a number of different multiplication operations before obtaining the correct result. In these situations it may particularly advantageous for a multiplier to have the capability of internally bypassing the results of a previous multiplication operation directly to the selection logic for another multiplication operation.

In some embodiments, square root and divide instructions may be translated into a series of special multiplication opcodes, wherein each multiplication opcode is configured to perform a particular function in addition to standard multiplication. For example, one of the iterative special multiplication instructions may be a "BACKMUL" instruction that accepts three source operands, A, B, and Q, and calculates the value B·Q−A.

In some embodiments, the multiplier may be further configured to detect divide operations having a multiplier that is exactly a power of two. The multiplier may be configured to execute these divide operations without proceeding through the entire iterative division process. Instead, the multiplier may be configured to shift the exponent and round the significand to the appropriate precision without significant additional hardware.

In some embodiments, the multiplier may be further configured to perform independent multiplication instructions during the idle clock cycles that may occur during complex iterative instructions such as square root and non-power of two divides.

BRIEF DESCRIPTION OF THE DRAWINGS

Other objects and advantages of the invention will become apparent upon reading the following detailed description and upon reference to the accompanying drawings in which:

FIG. 2 is a table listing special cases for a defined floating-point data format.

FIG. 6 is a table illustrating rounding constants for one embodiment of the multiplier from FIG. 5.

FIG. 10 is a table of rounding actions for one embodiment of the multiplier from FIG. 5.

Figure 1:
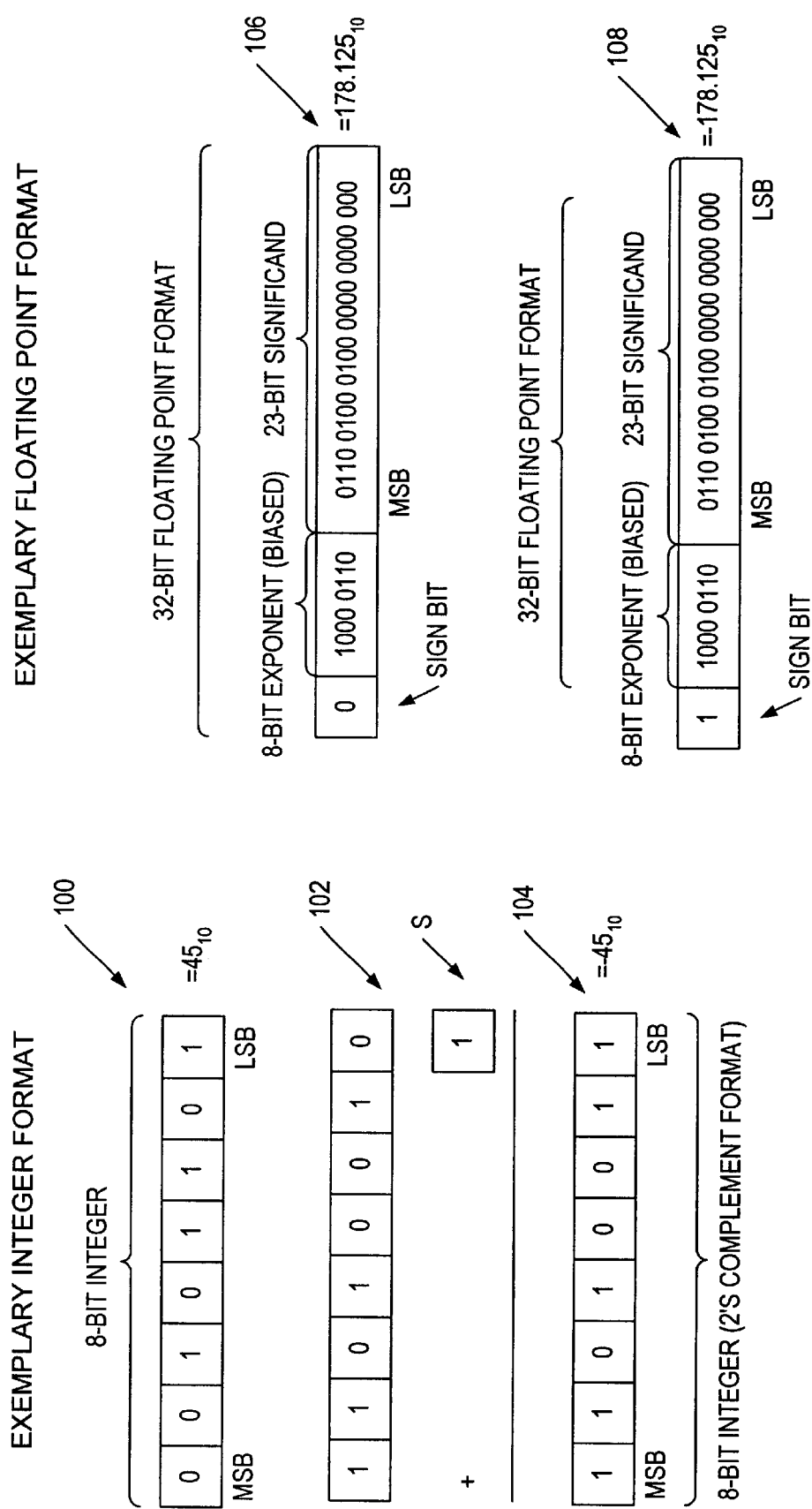
FIG. 1A is a diagram of an exemplary integer data format using two's complement representation.
FIG. 1B is a diagram of an exemplary floating-point data format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 3:
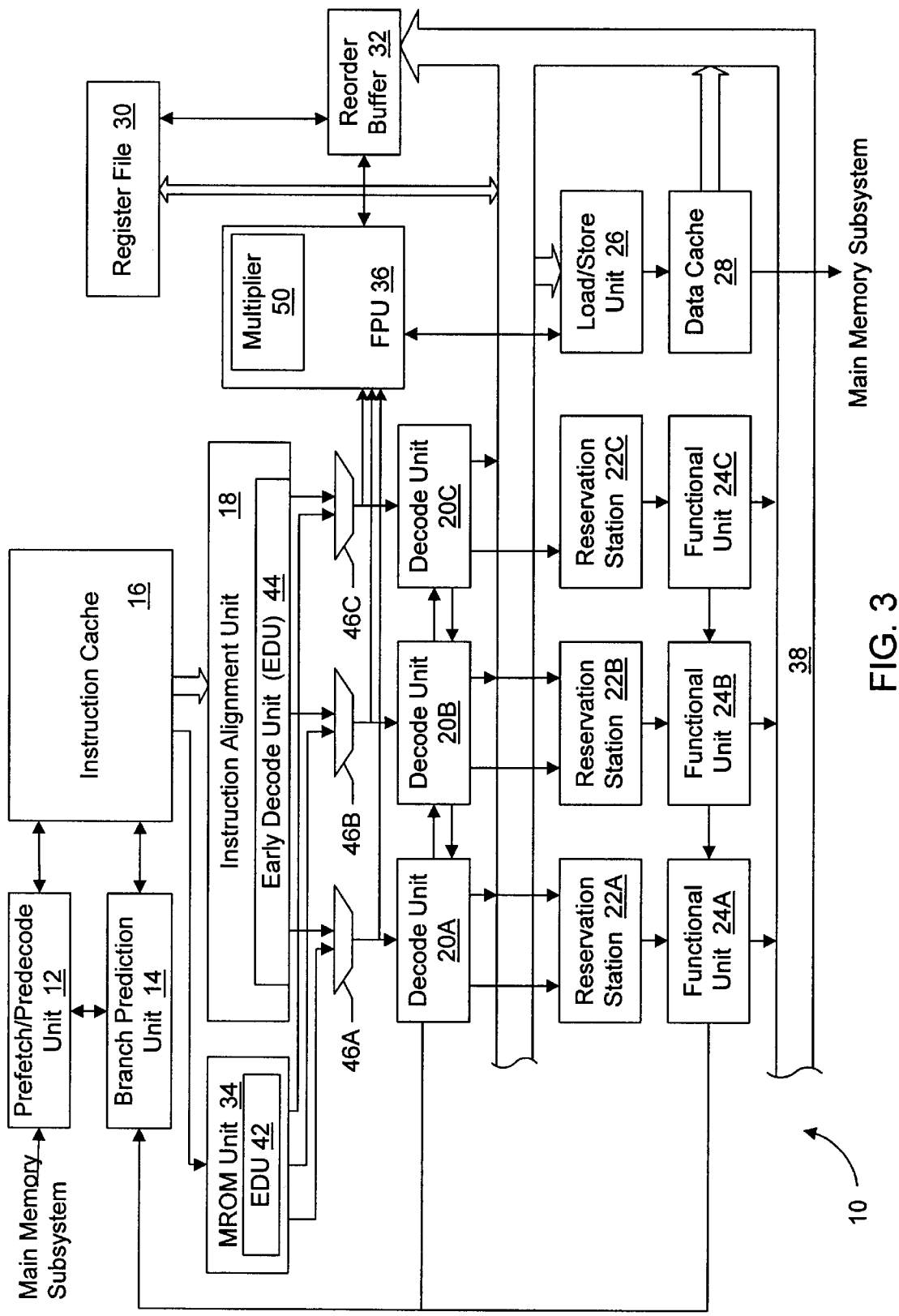
FIG. 3 is a block diagram of one embodiment of an exemplary microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As note above, the instructions may come from MROM unit 34 (microcode instructions) or instruction alignment unit 18 (fast path instructions). Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not retired prior to the exception). Stated another way, while some instructions following the exception-causing instruction may have been executed before the exception, their results have not been committed to the microprocessor's architectural state. It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded.

Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Floating Point Unit

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 4:
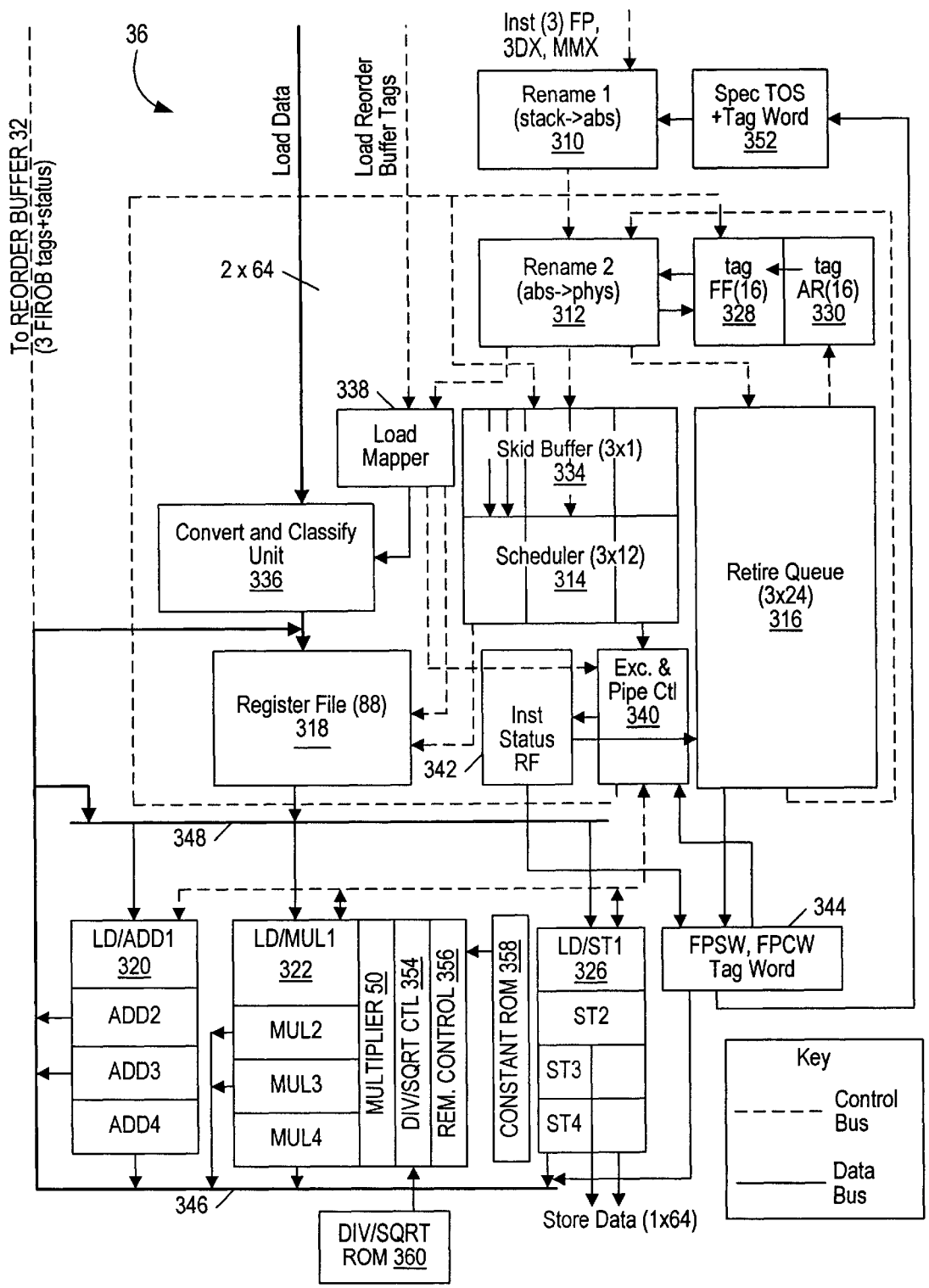
FIG. 4 is a block diagram of one embodiment of a floating-point unit from the exemplary microprocessor of FIG. 3.

Turning now to FIG. 4, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), a stack-relative reference (e.g., the destination ST(7)) is mapped to an absolute register number. Furthermore, in some embodiments load-execute instructions such as FADD [mem] also need to source operands converted from top-of-stack relative addressing to absolute addressing. Thus, in some embodiments x87 type instructions (i.e., floating point instructions) go through the stack to absolute register translation process, while MMX and 3DNow! instructions do not. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory source operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX instructions. Execution pipeline 322, which comprises multiplier 50, may also be configured to perform iterative calculations that involve multiplication, e.g., reciprocal operations, division operations, and square root operations, under the control of control unit 354, division/square root ROM 360, and, if a remainder is called for, remainder control unit 356. Constant ROM 358 is a read only memory configured to store a plurality of constants for load constant instructions such as FLDPI, for transcendental computation, for FPU 36 self-checking, and for certain special and exceptional results. Division/square root ROM 360 is a read only memory which stores constants used to determine initial values for division and square root computations and constants returned by certain 3DNow! instructions. Control unit 354 provides sequence information for division and square root functions. Note, in some embodiments control unit 354 may be part of execution and pipeline control unit 340.

In some cases, floating point instruction operands or floating point results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. In some cases, however, store data may be sent to both the load/store unit 26 and register file 318 (e.g., for floating point load control word instructions—FLDCW—and for stores if a denormal is being stored). The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
|------|----------|-------------|-------|
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (i.ff . . . if) of 0.11 . . . 11 is an unsupported value (wherein "i" is an integer bit and wherein "f" is a fractional bit). Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 340 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Multiplier

Figure 5:
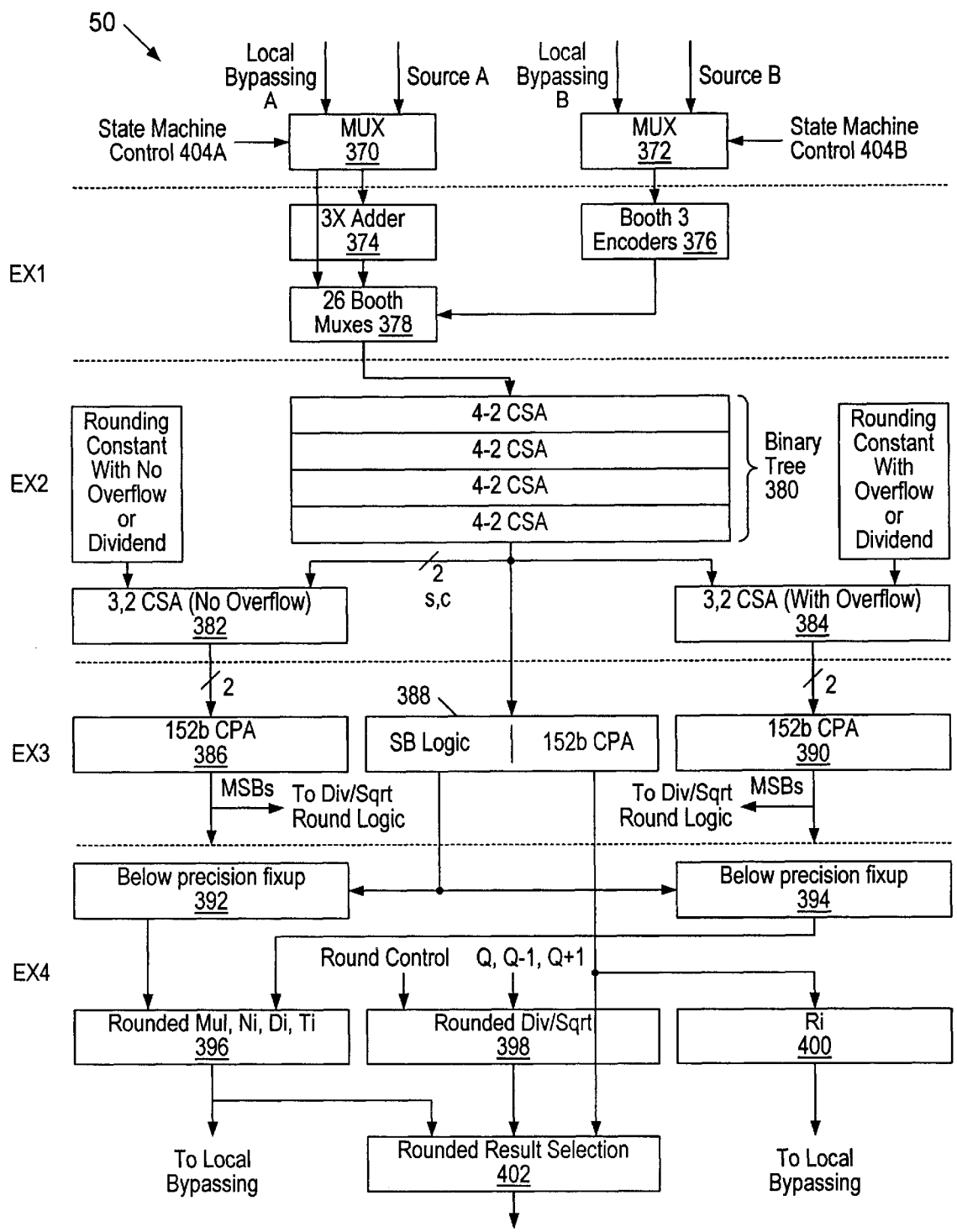
FIG. 5 is a block diagram depicting portions of one embodiment of the multiplier from FIG. 4.

FIG. 5 illustrates details of one embodiment of multiplier 50. In this embodiment, multiplier 50 comprises multiplexers 370 and 372, adder 374, booth encoders 376, booth multiplexers 378, adder tree 380, carry-save adders 382 and 384, carry-propagate adders 386–390, precision fix-up logic 392 and 394, storage registers 396–400, and final result selection multiplexer 402.

In response to receiving an instruction, multiplexers 370 and 372 are configured to select multiplier and multiplicand operands according to state machine control signals 404A and 404B. A state machine (not shown in the figure) controls multiplier 50 and causes multiplexers 370 and 372 to select operands appropriate for the particular instruction being executed. For example, in a standard scalar floating point multiplication, multiplexers 370 and 372 may be configured to select a scalar multiplier operand and a scalar multiplicand operand from memory or other source (e.g. the floating point unit's register stack). However, when performing other types of operations (e.g. square root and division operations) multiplexers 370 and 372 may select operands from other sources such as division/square root ROM 360 or from local bypassing register 396 and 400. The more complex multiplication operations that entail the use of local bypass register 396 and 400 will be described in greater detail below. The selected multiplier and multiplicand operands are then routed to adder 374 and booth encoders 376 respectively. The output from booth encoders 376 is conveyed to booth multiplexers 378 to select the corresponding partial products.

The selected partial products are then routed to adder tree 380 which comprises a plurality of carry-save adders. These carry-save adders sum the partial products and output a two-component result comprising (i) a carry component and (ii) a sum component. The carry and sum components are conveyed to carry-save adders 382 and 384. Carry-save adders 382 and 384 are configured to sum the carry and sum components with rounding constants (See FIG. 6) that assume no overflow and overflow conditions respectively. Thus, carry-save adder 382 sums the carry result, the sum result, and the rounding constant assuming there is no overflow. Similarly, carry-save adder 384 sums the carry result, the sum result, and a rounding constant assuming there is an overflow. Advantageously, by performing the calculation twice in parallel the effect of an overflow condition on processing time is minimized. Note, in some embodiments carry-save adders 382 and 384 form the final stage of adder tree 380. The results from carry-save adders 382 and 384 are routed in parallel to carry propagate adders 386 and 390. In parallel, the results from adder tree 380 are passed to carry propagate adder 388, which includes sticky bit logic to calculate a sticky bit used to round the results from carry propagate adder 386 and 390. The results from carry propagate adder 388 are provided to final result selection logic 402, which performs the task of selecting either the result generated assuming an overflow occurred or the result generated assuming an overflow did not occur. The results from carry propagate adders 386 and 390 are conveyed to below precision fix up logic 392 and 394 respectively. Fix up logic 392 and 394 utilize the sticky bit from carry propagate adder 388 to perform corrections assuming an overflow occurred and an overflow did not occur, respectively. These results are provided to final result selection logic 402 via rounding logic 396. Storage register 400 may be utilized to store the negated version (e.g., the one's complement or two's complement) of the sum of the sum component and carry component from adder tree 380.

In one embodiment, multiplier 50 may be implemented in static CMOS logic and may have a multiplier latency of four cycles. It may also be configured to operate on a maximum of 76-bit operands (i.e., excluding the exponent bits). Advantageously, this maximum width supports exactly rounded 68-bit division. Multiplier 50 may also be configured to perform all 3DNow!™ SIMD FP multiplication operations. As indicated in the figure, multiplier 50 is preferably implemented in a pipelined fashion to increase overall instruction throughput. One example configuration of pipelines stages is shown in FIG. 5. Pipeline stage EX1 is the first stage of multiplier 50. In stage EX1, overlapping groups of four bits of the multiplier operands are inspected are per the booth space three multiplier algorithm. In parallel, adder 374 generates the 3X multiple of the instruction's multiplicand. Booth encoders 376 then generate 26 control signals which control the selection of the 26 booth multiplexers (378) to form the appropriately-signed multiples of the multiplicand. This is described in greater detail below.

In the second pipeline stage, EX2, the 26 partial products are reduced to two using binary adder tree 380. The individual four-two adders of binary tree 380 may also be designed in static CMOS with single rail inputs and outputs. While a static dual rail compressor with dual rail inputs and outputs is typically faster than a single rail configuration, it is also larger and may require twice the routing resources. As discussed further below, adder tree 380 may effectively be implemented as a parallelogram. However, several folding and interleaving techniques may be applied to result in a rectangular adder tree (i.e., thereby leaving internal wire lengths constant).

At the end of the second pipeline stage EX2, the first portion of the multiplier's rounding algorithm is applied. This algorithm involves adding a rounding constant to the sum and parity outputs of adder tree 380. Since the normalization of the assimilated result may be unknown at this point, the addition is performed twice, i.e., both assuming no overflow occurs and assuming an overflow does occur, in carry-save adders 382 and 384 respectively. Advantageously, carry-save adders 382 and 384 may also be used to implement part of the "back-multiply and subtract" operation (referred to herein as the "BACKMUL" operation) which forms the remainder required for quotient and square root rounding.

The rounding constants used by carry-save adders 382 and 384 are shown in FIG. 6. Columns 420 through 426 illustrate the rounding constants used for single precision, double precision, extended precision, and internal precision, respectively. Rows 430 through 436 illustrate the rounding constants used for round-to-nearest, round-to-zero, round-to-minus infinity, and round-to-plus infinity rounding modes, respectively. Rows 438 through 442 show the rounding constants for divisions/square root specific operations, LASTMUL, ITERMUL, and BACKMUL operations, respectively. In FIG. 6, !x implies the bit inversion of x, and 24'b0 implies 24 zero bits.

In the third pipeline stage EX3, three versions of the carry-assimilated results are formed. Two of these results are rounded results assuming that either overflow or no overflow occurs. The third is the raw unrounded result. In parallel, sticky bit logic within adder 388 examines the low order bits of the sum and carry vectors.

In the fourth pipeline stage, EX4, the bits below the target precision are appropriately cleared. While the rounding constant applied in clock cycle EX2 ensures that the result is correctly rounded, it does not guarantee that the bits below the target least significant bit (LSB) are cleared, as may be required for x87 compatibility. The LSB is then conditionally inverted for regular multiplication operations (using the round-to-nearest rounding mode) as a function of the sticky bit to correctly handle the nearest-even case. Finally, the most significant bit (MSB) of the unrounded result determines whether or not overflow has occurred, and it selects between the no overflow and the with overflow rounded results. For division and square root iterations, an extra result $R_i$ is also provided. $R_i$ is the one's complement of the regular unrounded multiply result for division (and may also be used as an approximation to 3−N÷2 for the square root calculations). Both of the results are available for local storage and bypassing for use within division and square root iterations. In the case of the last cycle of a division or square root instruction, the BACKMUL instruction is performed by appropriately rounding the results chosen from the previously computed target results; the quotient ("Q"), the quotient plus one ("Q+1"), or the quotient minus one ("Q−1").

The unrounded result may also be used in the case of IEEE "tiny" results with the underflow exception masked. A tiny number occurs when the computed rounded result is below the minimum extended precision normal number. In this case, the unrounded result may be passed to a microcode handling routine which may properly denormalize and round the result for x87 compatibility. The unrounded result may also be used to determine whether round up has occurred for proper setting of the "C1" condition code bit in the floating point status word (i.e., bit 8). Roundup occurs when the rounded result differs from the unrounded result, and the C1 bit can be set appropriately given this information. For division and square root operations, the unrounded result is synthesized by appropriately choosing between Q−1 and Q.

Early Completion

In some embodiments, multiplier 50 may advantageously be configured to complete particular types of operations in fewer clock cycles than standard operations. One example of this is division by a number that is exactly a power of two. In theory, division by exact powers of two amounts to a simple reduction in the exponent leaving the significand unchanged. Accordingly, multiplier 50 may be configured to support variable-latency instructions. For divide-by power-of-two operations, the exponent adjustment occurs during the initial approximation lookup phase, while the rounding of the significand occurs using the LASTMUL and BACKMUL operations. Microprocessor 10 and multiplier 50 may be configured such that the latency of these operations are acceptable with respect to the notification time to the floating point unit's scheduler 314. The same approach may be utilized for multiplication by powers of two.

FIGS. 7–8

Figure 7:
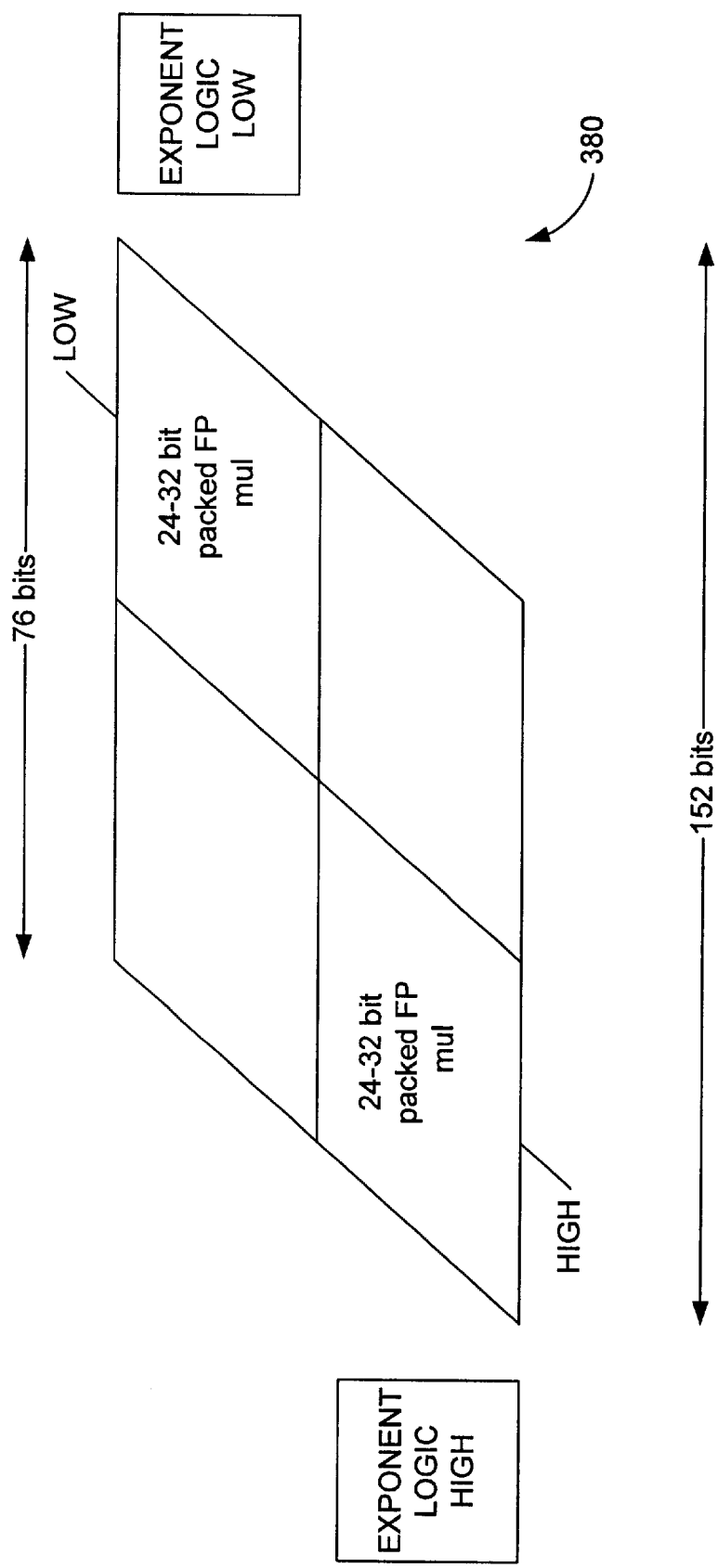
FIG. 7 is a block diagram illustrating generally one embodiment of the binary adder tree from the multiplier of FIG. 5.

FIG. 7 illustrates a block diagram illustrating one embodiment of multiplier 50 utilizing a parallelogram configuration for adder tree 380. As shown in the figure, the adder tree may be perform multiply a 76-bit multiplier operand and a 76-bit multiplicand operand, or a 24–32 bit packed floating point multiplier and a 24–32 bit packed floating point multiplicand.

Figure 8:
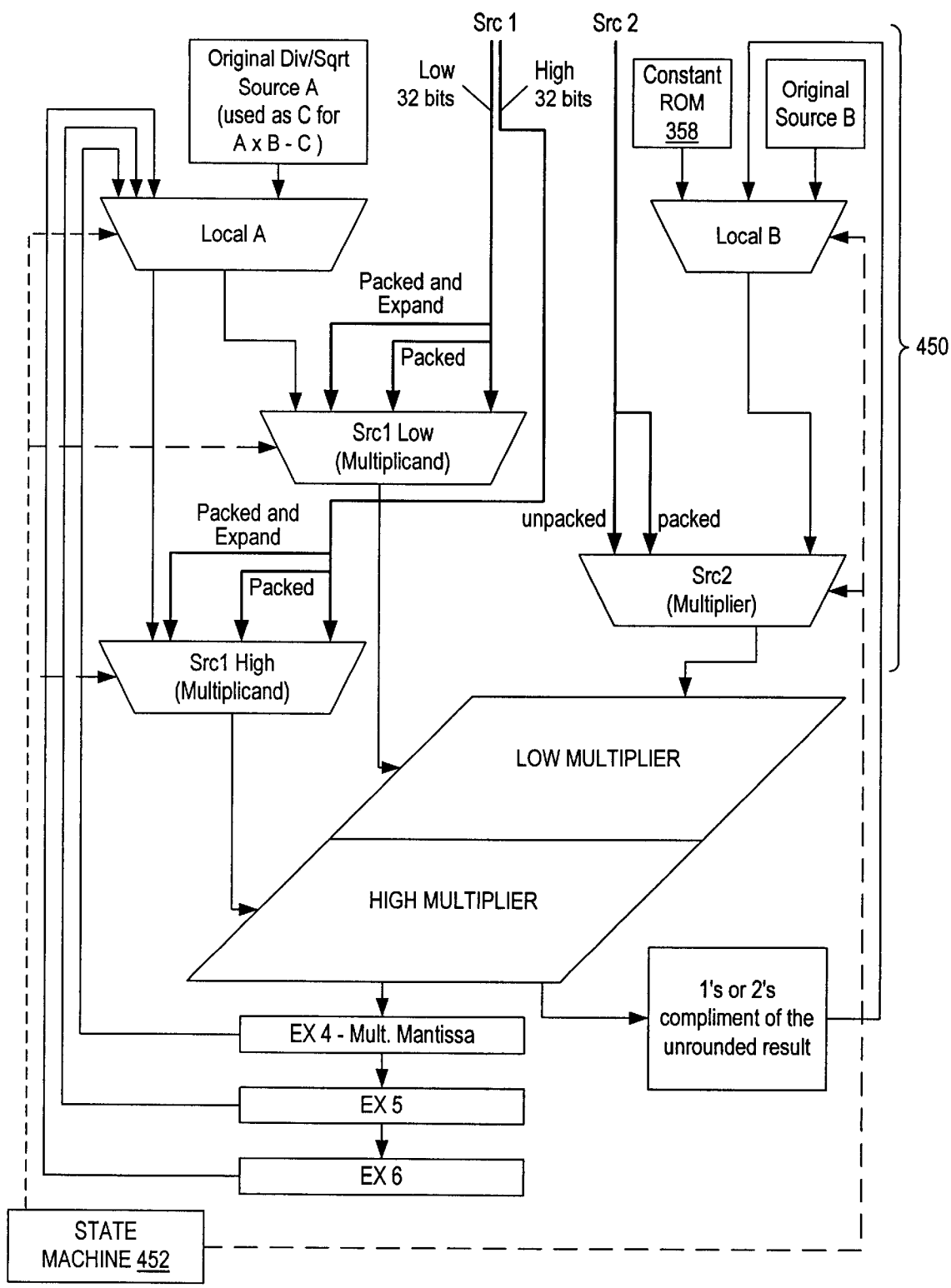
FIG. 8 is a block diagram illustrating more details of one embodiment of the multiplier from FIG. 7.

FIG. 8 illustrates more details of one embodiment of the multiplier from FIG. 7. In this embodiment, selection logic 450 is configured to allow multiplier 50 to select and multiply (a) two packed floating point operands, wherein each packed floating point operand comprises two or more individual floating point values; or (b) two scalar floating point operands, wherein each scalar operand comprises a single floating point value. As noted above, selection logic 450 also can be configured to select the results from adder tree 380 as an input for iterative multiplication and square root operations. As shown in the figure, selection logic 450 comprises a plurality of multiplexers configured to select from among the original source operands A and B, the results from a previous iterative operation, and constant ROM 358. As previously noted, state machine 452 comprises the control logic to direct multiplier 50 to perform standard multiplication operations, packed multiplication operations, and iterative calculations such as divide and square root.

Rounding

Figure 9:
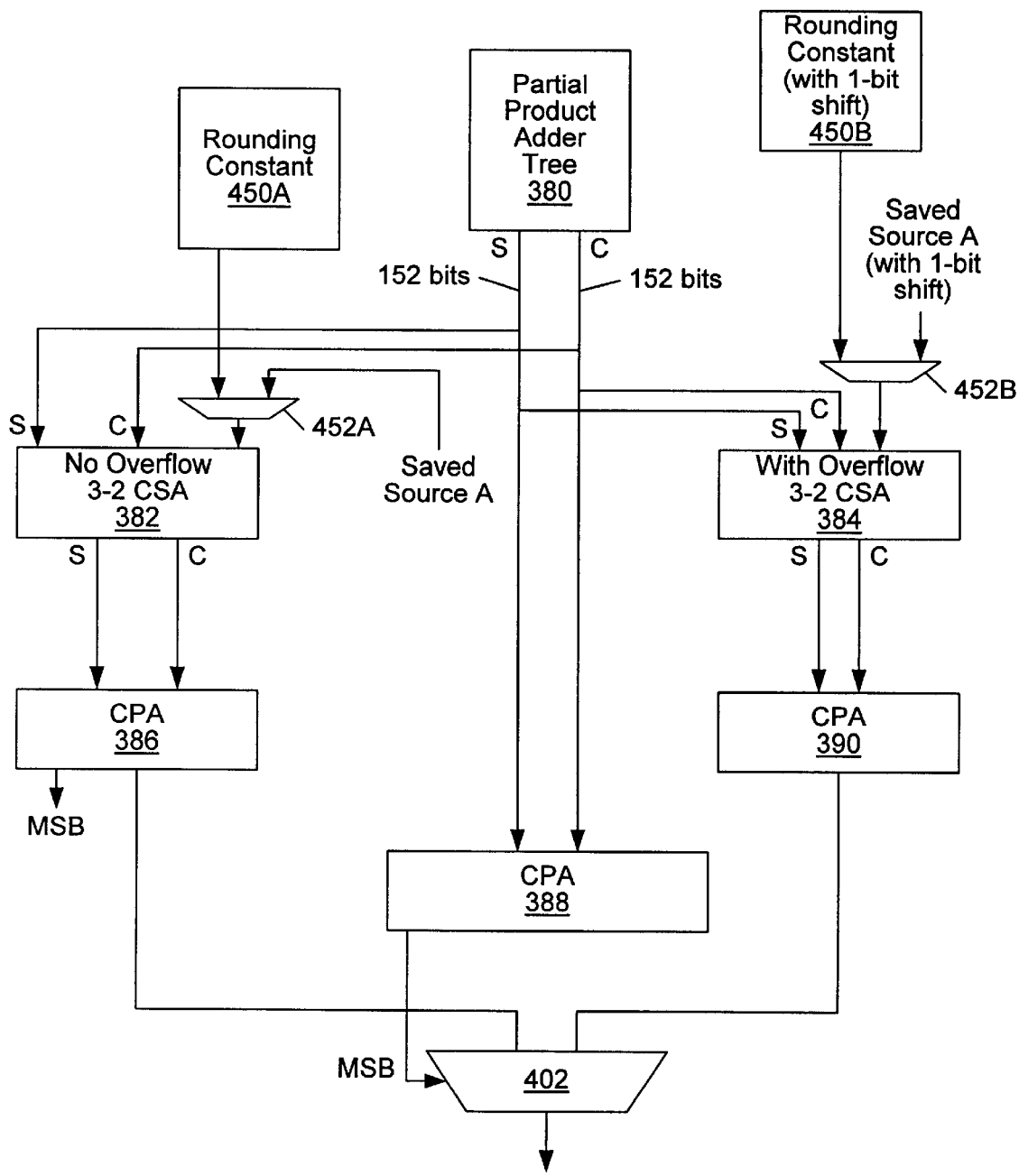
FIG. 9 is a block diagram illustrating more details of one embodiment of the selection logic of the multiplier from FIG. 5.

FIG. 9 illustrates more details of one embodiment of multiplier 50 and the pipeline stages EX2–EX4. As shown in the figure, the results from adder tree 380 are conveyed to carry-save adder ("CSA") 382, CSA 384, and carry-propagate adder ("CPA") 388. CSA 382 receives three input operands, the sum operand from adder tree 380, the carry component of the result from adder tree 380, and third input selected by multiplexer 452A. Multiplexer 452A is configured to select either rounding constant 450A (as described in the table of FIG. 6), or the original source A operand from the floating point instruction. Multiplexer 452B is configured to select either rounding constant 450B shifted one bit (as described in the table of FIG. 6), or the original source A operand from the floating point instruction, also shifted one bit.

Special Instructions

As previously noted, multiplier 50 may also be configured to execute a number of special instructions. For example, some of these instructions are components of iterative calculations such as divide and square root. Embodiments of these special instructions will be described below.

Itermul (A,B)

This is a multiplication operation of A and B that forces the rounding to be round to nearest. It assumes that each of the input operands are 76 bits wide and that the intermediate results (which is 152 bits wide) is rounded to 76 bits precision. This wider precision may be useful to correct the uncorrected rounding errors which accumulate throughout the iterations.

Lastmul (A, B, PC)

This is a multiplication operation of A and B that forces the rounding to be round to nearest. It performs the rounding to a precision 1 bit wider than the target precision specified by PC. For division, just prior to the rounding of this operation, the double with product "Q" prime may be required to be accurate to at least:

$$-2^{-(pc+2)} 21 \ Q-Q' < 2^{-(pc+2)}$$

where Q is the infinitely precise quotient, and pc is the target precision in bits, wherein 1 ulp (unit in the last place) for such a pc bit number is $2^{-(pc-1)}$. Exact rounding may require that the result have an error no worse than ±0.5 ulp, or $2^{31}$ PC. Multiplier 50 may be configured to utilize a rounding algorithm that ensures that the result is computed to an accuracy of at least one additional bit. This is because the final quotient result may be in the range of (0.5,2). Thus, 1 bit of normalization may be used, resulting in the potential need for the one additional bit of accuracy. For square root operations, just prior to the rounding the double-width product S' may be required to be accurate to at least:

$$-2^{-(pc+1)} \leq S - S' < 2^{-(pc+1)},$$

wherein S is the infinitely precise square root, and pc is the target precision in bits. Since the square root result is in the range [1,2), it may have a looser constraint on the accuracy of the input to this operation.

After rounding and normalizing to pc +1 bits through the LASTMUL op, the resulting value R" may satisfy:

$$-2^{-pc} < R - R'' < 2^{-pc},$$

wherein R is either the infinitely precise quotient or square root as appropriate. Thus, the value may have an error of (−0.5,+0.5) ulp with respect to the final pc bit number.

Backmul(B,Q,A)

This is a multiplication operation that operates on two source operands B and Q, and it also accepts a third operand A. The 152-bit intermediate product of the two sources in carry-save form is added with an inverted version of the third operand, with the low-order bits filled with 1's as shown in the table in FIG. 6. These three values are then input into rounding carry-save adders 382 and 384, with the unused lsb carry bit set to one, realizing the function of B×Q+TwosComp(A). This implements the negative version of the back multiply and subtraction operation to form the remainder, that is:

$$B \times Q - A$$

is implemented instead of the desired $$A - B \times Q.$$

The sign of this remainder is thus the negative of the true remainder sign. This operation returns two bits of status: whether the sign of the remainder is negative, taken from a high order bit of the result, and whether the remainder is exactly zero, using fast sticky-bit logic. Since Q could be rounded to any of four precisions, the high order bit is chosen high enough to allow it to suffice for all of the precisions.

Comp1(x)

This operation returns the one's complement by bit inversion of the unrounded version of the currently-computed product. The unbiased exponent is forced to either −1 or 0 depending upon whether the result should be in the binade [0.5,1) or [1,2). Using the one's complement instead of the two's complement in the iterations may add a small amount of error in some embodiments. However, this error may be taken into account when designing the width of the multiplier and the required accuracy of any initial approximations (e.g., from constant ROM 360).

Comp3(x)

This operation returns an approximation of (3−x)/2 for the unrounded version of the currently-computed product. This approximation may be formed by bit inversion and shifting.

Round(qi,rem,pc,rc)

This rounding function may be configured to assume that a biased trial result qi has been computed with pc +1 bits, which is known to have an error of (−0.5,+0.5) ulp with respect to pc bits. The extra bit, or guard bit, may be used along with the sign of the remainder, a bit stating whether the remainder is exactly zero, and rc to choose which of the three possible results, q, q−1, or q+1 are equal to qi truncated to pc bits and decremented or incremented appropriately. One embodiment of the actions taken for the round function are shown in FIG. 10. The rounding details are shown in FIG. 10. In the figure, RN represents round-to-nearest, RNE represents round-to-nearest-even, RP represents round to positive infinity, RM represents round to minus infinity, and RZ represents round-to-zero.

For RN, in the case of an exactly halfway situation, it may be necessary to inspect L, the least significant bit of q to determine the action. If L=0, then the result is correctly rounded to nearest-even. Otherwise, the result is incremented to the closest even result. It should be noted that for division where the precision of the input operands is the same as that of the result, the exact halfway case will not occur. Only when the result precision is smaller than the inputs can such a result occur and rounding be required. For the directed rounding modes RP and RM, the action may depend upon the sign of the quotient estimate. Those entries that contain two operations such as pos/neg are for the sign of the final result itself being positive and negative respectively.

This function, along with the computation of q−1 and q+1, may be implemented in multiplier 50 in parallel with the BACKMUL operation. The status information from the BACKMUL op may be used as input to the ROUND function to quickly choose and return the correctly-rounded result.

Additional details regarding a number of the features of different embodiments of multiplier 50 (e.g., the use of the special instructions, division, square root operations, and rounding) may be found in the parent applications cited at the beginning of this application.

Computer System

Figure 11:
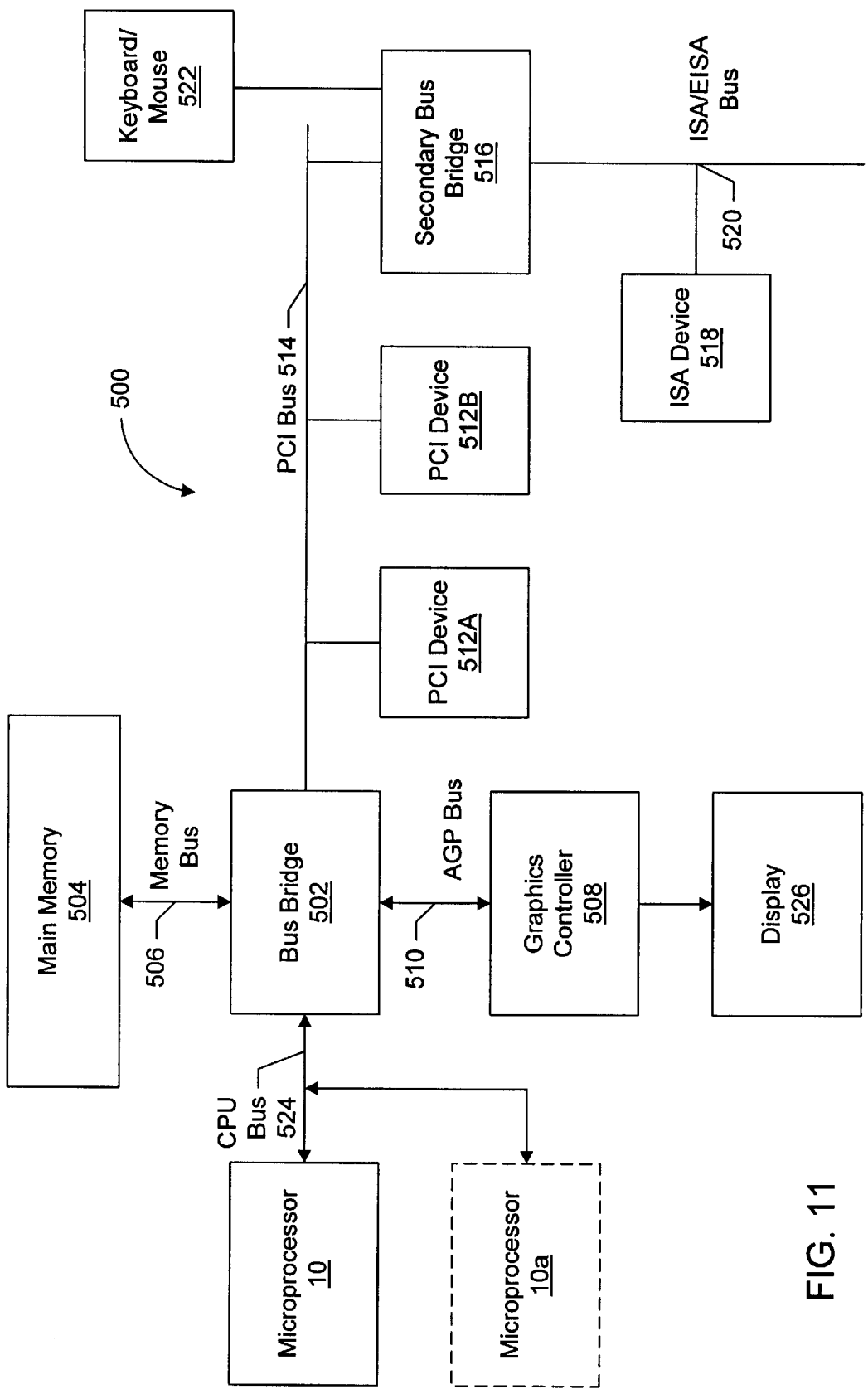
FIG. 11 is a block diagram of one embodiment of a computer system configured to utilize the microprocessor of FIG. 1.

Turning now to FIG. 11, a block diagram of one embodiment of a computer system 500 configured to utilize one embodiment microprocessor 10 with multiplier 50 is shown. Microprocessor 10 is coupled to a variety of system components through a bus bridge 502. Other embodiments are possible and contemplated. In the depicted system, a main memory 504 is coupled to bus bridge 502 through a memory bus 506, and a graphics controller 508 is coupled to bus bridge 502 through an AGP bus 510. Finally, a plurality of PCI devices 512A–512B are coupled to bus bridge 502 through a PCI bus 514. A secondary bus bridge 516 may further be provided to accommodate an electrical interface to one or more EISA or ISA devices 518 through an EISA/ISA bus 520. Microprocessor 10 is coupled to bus bridge 502 through a CPU bus 524.

Bus bridge 502 provides an interface between microprocessor 10, main memory 504, graphics controller 508, and devices attached to PCI bus 514. When an operation is received from one of the devices connected to bus bridge 502, bus bridge 502 identifies the target of the operation (e.g. a particular device or, in the case of PCI bus 514, that the target is on PCI bus 514). Bus bridge 502 routes the operation to the targeted device. Bus bridge 502 generally translates an operation from the protocol used by the source device or bus to the protocol used by the target device or bus.

In addition to providing an interface to an ISA/EISA bus for PCI bus 514, secondary bus bridge 516 may further incorporate additional functionality, as desired. For example, in one embodiment, secondary bus bridge 516 includes a master PCI arbiter (not shown) for arbitrating ownership of PCI bus 514. An input/output controller (not shown), either external from or integrated with secondary bus bridge 516, may also be included within computer system 500 to provide operational support for a keyboard and mouse 522 and for various serial and parallel ports, as desired. An external cache unit (not shown) may further be coupled to CPU bus 524 between microprocessor 10 and bus bridge 502 in other embodiments. Alternatively, the external cache may be coupled to bus bridge 502 and cache control logic for the external cache may be integrated into bus bridge 502.

Main memory 504 is a memory in which application programs are stored and from which microprocessor 10 primarily executes. A suitable main memory 504 comprises DRAM (Dynamic Random Access Memory), and preferably a plurality of banks of SDRAM (Synchronous DRAM).

PCI devices 512A–512B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 518 is illustrative of various types of peripheral devices, such as a modem, a sound card, and a variety of data acquisition cards such as GPIB or field bus interface cards.

Graphics controller 508 is provided to control the rendering of text and images on a display 526. Graphics controller 508 may embody a typical graphics accelerator generally known in the art to render three-dimensional data structures which can be effectively shifted into and from main memory 504. Graphics controller 508 may therefore be a master of AGP bus 510 in that it can request and receive access to a target interface within bus bridge 502 to thereby obtain access to main memory 504. A dedicated graphics bus accommodates rapid retrieval of data from main memory 504. For certain operations, graphics controller 508 may further be configured to generate PCI protocol transactions on AGP bus 510. The AGP interface of bus bridge 502 may thus include functionality to support both AGP protocol transactions as well as PCI protocol target and initiator transactions. Display 526 is any electronic display upon which an image or text can be presented. A suitable display 526 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 500 may be a multiprocessing computer system including additional microprocessors (e.g. microprocessor 10a shown as an optional component of computer system 500). Microprocessor 10a may be similar to microprocessor 10. More particularly, microprocessor 10a may be an identical copy of microprocessor 10. Microprocessor 10a may share CPU bus 524 with microprocessor 10 or may be connected to bus bridge 502 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for performing integer and floating point multiplication, the method comprising:

detecting a type of multiplication operation to be performed;

asserting one or more control signals in response to detecting the type of multiplication operation to be performed;

conveying the asserted control signals to a multiplier and selection logic configurable to perform the multiplication operation;

selecting a multiplier operand and a multiplicand operand corresponding to the multiplication operation to be performed in response to the asserted control signals;

multiplying the multiplier operand and the multiplicand operand, wherein the multiplication operation is selected from the group comprising: scalar floating point multiplication operations, iterative multiplication operations performed in the context of a divide operation, and iterative multiplication operations performed in the context of a square root operation;

detecting floating point divide operations that have divisors that are exactly a power of two in response to detecting an iterative multiplication operation associated with a divide operation; and executing the divide by power of two operation by:
        shifting dividends; and
        rounding the result to the appropriate precision using a specified rounding mode.

2. A method for performing integer and floating point multiplication, the method comprising:

detecting a type of multiplication operation to be performed;

asserting one or more control signals in response to detecting the type of multiplication operation to be performed;

conveying the asserted control signals to a multiplier and selection logic configurable to perform the multiplication operation;

selecting a multiplier operand and a multiplicand operand corresponding to the multiplication operation to be performed in response to the asserted control signals;

multiplying the multiplier operand and the multiplicand operand, wherein the multiplication operation is selected from the group comprising: scalar floating point multiplication operations, iterative multiplication operations performed in the context of a divide operation, and iterative multiplication operations performed in the context of a square root operation;

wherein multiplying includes:
- generating a plurality of partial products;
- summing the partial products using an adder tree to generate a sum component and a carry component;
- summing the sum component and the carry component assuming there is no overflow to generate a first result;
- summing the sum component and the carry component assuming there is an overflow to generate a second result; and
- selecting either the first result or the second result based on a most significant bit of either the first result or the second result.

3. The method as recited in claim 2, wherein said multiplying further comprises:
- selectively adding a rounding constant to the first result and the second result.

4. A floating point unit comprising:
a multiplier configured to perform scalar floating point multiplication of the form A×B,
wherein the multiplier includes:
- a binary adder tree configured to generate a result having a sum component and a carry component; and
- an overflow adder coupled to the binary adder tree and configured to sum the sum component and the carry component from the adder tree with a first rounding constant assuming the resulting sum will be normalized and have an overflow;
- a non-overflow adder coupled to the binary adder tree and configured to sum the sum component and the carry component from the adder tree with a second rounding constant assuming the resulting sum will be normalized and not have an overflow; and
- a non-rounding adder coupled to the binary adder tree and configured to sum the sum component and the carry component from the adder tree assuming the result is not be rounded.

5. The floating point unit as recited in claim 4, wherein the binary adder tree comprises a plurality of cascaded carry-save adders, and wherein each of the overflow adder, the non-overflow adder, and the non-rounding adder is a carry-propagate adder.

6. The floating point unit as recited in claim 4, wherein the multiplier is further configured to perform scalar floating point operations of the form X×Y−Z. wherein X, Y and Z are floating point operands, and wherein the product X×Y is either (i) in the same binate as Z, or (ii) one binate greater than Z, wherein the multiplier further comprises one or more inverters configured to generate the one's complement of Z, wherein the overflow adder and the non-overflow adder are configured to receive and sum (a) the one's complement of Z, (b) the product X×Y, and (c) a constant one.

7. The floating point unit as recited in claim 6, wherein X and Y are equal for square root instructions.

8. The floating point unit as recited in claim 6, wherein X and Y need not be equal for divide instructions.

9. The floating point unit as recited in claim 4, further comprising selection logic configured to select the results from the non-rounding adder if the results from either the overflow adder or the non-overflow adder is determined to be below a predetermined minimum value.

10. The floating point unit as recited in claim 9, wherein the multiplier is configured to call a microcode routine upon selecting the results from the non-rounding adder in response to a masked bit being set, wherein the microcode routine is configured to denormalize the results from the non-rounding adder, round the denormalized result, and then normalize the rounded denormalized result.

11. The floating point unit as recited in claim 4 further comprising selection logic configured to select two source operands for the multiplier to multiply.

12. The floating point unit as recited in claim 11, wherein the source operands are selected from at least the following:
(a) original source operands including: two packed floating point values, wherein each packed floating point value comprises two or more individual floating point values, and two scalar floating point values; and
(b) results stored in a result register.

13. The floating point unit as recited in claim 12, wherein the multiplier further comprises a state machine coupled to the selection logic, wherein the state machine is configured to cause the selection logic to select the stored results in response to the multiplier executing a division instruction by performing iterative multiplication operations.

14. The floating point unit as recited in claim 12, wherein the multiplier further comprises a state machine coupled to the selection logic, wherein the state machine is configured to cause the selection logic to select the stored results in response to the multiplier executing a square root instruction by performing iterative multiplication operations.

15. The floating point unit as recited in claim 12, wherein the selection logic comprises a first multiplexer unit configured to select a multiplier operand for the multiplier, and a second multiplexer unit configured to select a multiplicand operand for the multiplier, wherein the first multiplexer unit is configured to select from at least the original source operands and the stored results.

16. A computer system comprising:
a processor;
a main system memory coupled to the processor via a bus;
wherein the processor includes a floating point unit including:
- a multiplier configured to perform floating point multiplication of the form A×B;
- a register configured to store results generated by the multiplier; and
- selection logic configured to select source operands for the multiplier to multiply,
wherein the multiplier includes:
  - a binary adder tree configured to generate a result having a sum component and a carry component; and
  - an overflow adder coupled to the binary adder tree and configured to sum the sum component and the carry component from the adder tree with a first rounding constant assuming the resulting sum will be normalized and have an overflow;
  - a non-overflow adder coupled to the binary adder tree and configured to sum the sum component and the carry component from the adder tree with a second rounding constant assuming the resulting sum will be normalized and not have an overflow; and a non-rounding adder coupled to the binary adder tree and configured to sum the sum component and the carry component from the adder tree assuming the result is not be rounded.

17. The computer system as recited in claim 16, wherein the source operands are selected from at least the following:

(a) original source operands including: two packed floating point values, wherein each packed floating point value comprises two or more individual floating point values, and two scalar floating point values; and (b) the results stored in the register.

18. The computer system as recited in claim 17, wherein the multiplier further comprises a state machine coupled to the selection logic, wherein the state machine is configured to cause the selection logic to select the stored results in response to the multiplier executing a division instruction by performing iterative multiplication operations.

19. The computer system as recited in claim 17, wherein the multiplier further comprises a state machine coupled to the selection logic, wherein the state machine is configured to cause the selection logic to select the stored results in response to the multiplier executing a square root instruction by performing iterative multiplication operations.

20. The computer system as recited in claim 16, wherein the selection logic comprises a first multiplexer unit configured to select a multiplier operand for the multiplier, and a second multiplexer unit configured to select a multiplicand operand for the multiplier, wherein the first multiplexer unit is configured to select from at least the original source operands and the stored results.

* * * * *